United States Patent [19]

Hasegawa et al.

[11] Patent Number: 5,140,656
[45] Date of Patent: Aug. 18, 1992

[54] SOLITON OPTICAL FIBER COMMUNICATION SYSTEM

[75] Inventors: Akira Hasegawa, New Providence, N.J.; Yuji Kodama, Worthington, Ohio; Dietrich Marcuse, Lincroft, N.J.

[73] Assignee: AT&T Bell Laboratories, Murray Hill, N.J.

[21] Appl. No.: 744,615

[22] Filed: Aug. 12, 1991

[51] Int. Cl.$^5$ .............................. G02B 6/28; H04J 1/00
[52] U.S. Cl. ...................................... 385/24; 385/39; 385/31; 359/124; 359/173; 359/341
[58] Field of Search ................ 385/24, 22, 38, 31, 385/39, 88, 89, 147; 359/333, 341, 123, 124, 115, 164, 174, 179, 188, 173

[56] References Cited

U.S. PATENT DOCUMENTS

| | | | |
|---|---|---|---|
| 4,406,516 | 9/1983 | Hasegawa | 385/39 X |
| 4,460,241 | 7/1984 | Cohen | 359/124 |
| 4,558,921 | 12/1985 | Hasegawa et al. | 385/39 X |
| 4,633,524 | 12/1986 | Hasegawa | 359/134 |
| 4,700,339 | 10/1987 | Gordon et al. | 359/134 |
| 4,749,248 | 6/1988 | Aberson, Jr. et al. | 385/24 |
| 4,947,134 | 8/1990 | Olsson | 359/173 |
| 5,035,481 | 7/1991 | Mollenauer | 385/24 |
| 5,050,949 | 9/1991 | DiGiovanni et al. | 385/24 |
| 5,058,974 | 10/1991 | Mollenauer | 385/24 |
| 5,080,505 | 1/1992 | Epworth | 385/24 |

OTHER PUBLICATIONS

"Random Walk of Coherently Amplified Solitons in Optical Fiber Transmission", by J. P. Gordon et al., *Optics Letters*, vol. 11, No. 10, Oct. 1986, pp. 665-667.
"10 Gbit/s Soliton Data Transmission Over One Million Kilometers", by M. Nakazawa et al., *Electronics Letters*, vol. 27, No. 14, Jul. 4, 1991, pp. 1270-1272.
"Long-Distance Soliton Propagation Using Lumped Amplifiers and Dispersion Shifted Fiber", by L. F. Mollenauer et al., *Journal of Lightwave Technology*, vol. 9, No. 2, Feb. 1991, pp. 194-197.
"Wavelength Division Multiplexing with Solitons in Ultra-Long Distance Transmission Using Lumped Amplifiers", by L. F. Mollenauer et al., *Journal of Lightwave Technology*, vol. 9, No. 3, Mar. 1991, pp. 362-367.
"Pigtailed High-Finesse Tunable Fiber Fabry-Perot Interferometers With Large, Medium and Small Free Spectral Ranges", by J. Stone et al., *Electronics Letters*, vol. 23, No. 15, Jul. 16, 1987, pp. 781-783.

*Primary Examiner*—Brian Healy
*Attorney, Agent, or Firm*—E. E. Pacher

[57] ABSTRACT

In soliton optical fiber communication systems that comprise a multiplicity of spaced-apart intermediate non-electronic amplifiers, pulse arrival time jitter can be substantially reduced by incorporation into the transmission path of spaced-apart bandwidth-limiting elements. Exemplarily, the bandwidth-limiting elements are optical filters of bandwidth $B_f$, with a filter associated with each intermediate amplifier, and with $B_f$ chosen to fall within the range $B_{sol}(N_f/3)^{\frac{1}{2}}$, where $B_{sol}$ is the FWHM spectral width of the soliton pulses, and $N_f$ is the number of intermediate filters in the system. More generally, the bandwidth-limiting elements are selected such that $>\delta t^2>$, the variance of the jitter, is at most 90% of the variance associated with an, otherwise identical, comparison system that does not contain the bandwidth-limiting elements. Systems according to the invention thus can overcome the Gordon-Haus limit on the bit rate/distance product.

13 Claims, 7 Drawing Sheets

SOLITON OPTICAL FIBER COMMUNICATION SYSTEM

FIELD OF THE INVENTION

This invention pertains to the field of optical fiber communication systems.

BACKGROUND OF THE INVENTION

It is known that the use of soliton pulses in optical fiber communication systems potentially makes possible systems having exceedingly high information transmission capacity. See, for instance, U.S. Pat. No. 4,406,516, incorporated herein by reference. It is also known that soliton pulses can be compatible with non-electronic amplification, e.g., amplification by means of optical amplifiers such as Raman effect fiber amplifiers or rare earth (e.g., erbium)-doped fiber amplifiers, but not excluding such amplifiers as non-electronic semiconductor amplifiers. See, for instance, U.S. Pat. No. 4,558,921, also incorporated herein by reference.

It has recently become apparent that prior art soliton communication systems using intermediate amplification are not likely to be capable of operation at the projected very high bit rates over large distances, due to significant temporal jitter in the soliton arrival at the receiver end of the system. This jitter is due to, inevitably present, amplifier noise associated with the intermediate amplifiers in the system. This jitter-generating mechanism is frequently referred to as the Gordon-Haus effect. See J. P. Gordon et al., *Optics Letters*, Vol. 11(10), pp. 665–667. Jitter at the receiver can also be due to temporal or amplitude jitter at the transmitter. By "jitter" is meant a timing error in pulse arrival time. Regardless of the source of the jitter, its existence can severely limit the useful bit rate for long length prior art soliton communication system designs.

A technique for eliminating the jitter is disclosed in M. Nakazawa et al., *Electronics Letters*, Vol. 27, page 1270. The technique utilizes active electronic components such as modulators and thus is relatively complex and would at best be costly and difficult to implement.

In view of the evident importance of communication systems capable of operation at the highest possible bit rates over large distances it would be highly desirable to have available soliton systems that comprise relatively simple and low cost means for eliminating, or at least substantially reducing, pulse temporal jitter at the receiver. This application discloses such soliton systems.

SUMMARY OF THE INVENTION

We have made the surprising discovery that the pulse arrival jitter in a soliton fiber communication system comprising a multiplicity of intermediate, spaced-apart non-electronic amplifiers can be substantially reduced if the optical fiber transmission path comprises a multiplicity of spaced-apart bandwidth-limiting elements of appropriate bandwidth. In principle the invention can be embodied in a system using narrow-band amplifiers selected to have the appropriate frequency-dependent gain. However, in most cases it will be more convenient to use separate bandwidth-limiting elements, typically in-line optical filters of the appropriate bandwidth. The gain characteristics $g(\omega)$ of the bandwidth-limiting elements are selected such that the pulse arrival jitter at an appropriate downstream point in the inventive system (e.g., the receiver, or an intermediate point such as a branch point) is significantly lower (e.g., at least 10% lower) than the jitter at the same point in a comparison system that differs from the inventive system only in not containing the bandwidth-limiting elements. The comparison system thus is a broadband system whose loss is essentially independent of frequency over the relevant frequency range.

More specifically, an optical fiber communication system according to the invention comprises means for generating optical pulses, means that are responsive to the pulses, and a length L of optical fiber transmission path that pulse-transmissively connects the generating means and the responsive means. If appropriate, the system may comprise means for coupling the pulses into the core of the optical fiber. Such means are well known. The length L of transmission path comprises not only appropriate single mode optical fiber but also contains a multiplicity of spaced-apart non-electronic amplifiers (e.g., Er-doped optical fiber amplifiers) and associated components such as couplers and pump sources. The length L typically is thousands of kilometers and, exemplarily, the generating means and the responsive means are on different continents.

The inventive optical fiber communication system is adapted for operation as a soliton fiber communication system. Those skilled in the art will appreciate that by a "soliton" system we mean not only a system that uses classical solitons as described in U.S. Pat. No. 4,406,516, but also a system that uses so-called "path average" solitons. For more detail on the latter see, for instance, L. F. Mollenauer et al., *Journal of Lightwave Technology*, Vol. 9, pp. 194–197, and pp. 362–367, both incorporated herein by reference. Associated with the soliton pulses that are transmitted through the transmission path are a center frequency $\omega_o$ (exemplarily corresponding to a center wavelength of about 1.55 μm), and a nominal bandwidth $B_{sol}$, where $B_{sol}\tau_{sol}=0.314$, with $\tau_{sol}$ being the full width at half maximum (FWHM) temporal width of the soliton pulse.

Significantly, the inventive soliton system also comprises a multiplicity of bandwidth-limiting elements (typically optical filters) selected to have a frequency-dependent gain characteristic $g(\omega)$, such that the pulse arrival jitter at the responsive means is at least 10% less than the pulse arrival jitter associated with an, otherwise identical, soliton system that does not contain said bandwidth-limiting elements, such that the loss associated with the transmission path of the comparison systems is essentially frequency independent over the relevant frequency range. Exemplarily the relevant frequency range $\Delta\omega$ includes $\omega_o \pm 10B_{sol}$.

Although it is likely that in practice in many cases the number of bandwidth-limiting elements (henceforth "filters") in the system will be equal to the number of intermediate optical amplifiers, with each filter associated with (typically following) an amplifier, there is no requirement that this be the case. Filters need not be co-located with amplifiers, and the number of filters ($N_f$) need not be the same as the number of amplifiers ($N_{amp}$). It is only required that the filters be spaced apart, with $N_f$ being selected such that the desired degree of jitter reduction results. However, in order to simplify exposition, it will henceforth frequently be assumed that $N_f = N_{amp}$, and that each filter is co-located with (typically following) one of the intermediate amplifiers. For the same reson it will henceforth be assumed that $\omega_o$, the center frequency of the soliton pulses, is equal to $\omega_f$, the nominal center frequency of the filter passband ($\omega_f$ typically is the frequency at which $dg(\omega)/d\omega=0$). However, it should be understood that this is not a requirement for the practice of the invention, and that it is possible to embody the invention in system in which $\omega_o$ is not equal to $\omega_f$. At least in principle $|\omega_o-\omega_f|$ can be even greater than $B_{sol}$, although we believe that it will in many cases be advantageous to design inventive soliton systems such that $\omega_f$ is at least approximately equal to $\omega_o$.

Furthermore, it should be understood that systems according to the invention are not limited to a single operating frequency, but that the invention can be readily embodied in WDM (wavelength division multiplexed) systems. The discussion herein will be in terms of systems having a single operating frequency $\omega_o$, but those skilled in the art will have no problem extending the principles of the invention to WDM systems.

In exemplary embodiments of the invention the filters (exemplarily Fabry-Perot etalons) have bandwidth in the range 5-20 $B_{sol}$, preferably 8-15 $B_{sol}$. In general, use of too narrow filters results in degradation of the solitons, and use of too wide filters results in increased jitter. In a particular exemplary system a filter bandwidth of about 10 $B_{sol}$ was found to yield optimal results.

DETAILED DESCRIPTION

As shown by Gordon et al. (op. cit., incorporated herein by reference), the variance of the arrival time jitter, $<\delta t^2>$, in a soliton system of length L, with optical amplifiers (of gain $G \sim \Gamma z_a + 1$), spaced periodically a distance $z_a$ apart, is approximately equal to $\Gamma A L^3/9N_o$. In this expression, $\Gamma$ is the power loss per unit length of the fiber, A is the amplitude of the soliton pulses, and $N_o$ is the number of photons (of frequency $\omega_o$) per unit energy. This result was derived assuming constant gain over the spectral width of the solitons.

We have discovered that, by incorporation into the transmission path of filters having appropriately chosen gain characteristic $g(\omega)$, the jitter can be at least substantially reduced, compared to the above Gordon-Haus value. Specifically, we have discovered that the jitter can be reduced to about $(\Gamma A L^3/9N_o)f(x)$, where f(x) is a jitter reduction factor that is always less than 1 for $x<0$. An exemplary jitter reduction factor f(x) is plotted in FIG. 1.

Figure 1:
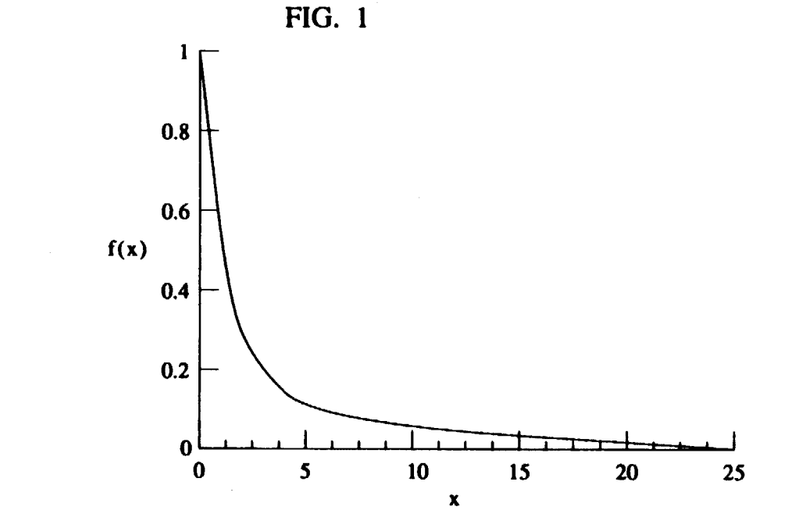
FIG. 1 shows a diagram of f(x) vs. x, where x is a parameter that depends, inter alia, on the filter bandwidth, and f(x) is the jitter reduction factor.

Although f(x) of FIG. 1 has been calculated for a particular class of soliton systems (having $N_f=N_{amp}$, with both amplifiers and filters regularly spaced, a distance $z_a$ apart, and with $\omega_o=\omega_f$), we believe that f(x) will in general substantially resemble FIG. 1. Those skilled in the art will appreciate that for any desired soliton system an applicable f(x) can be determined by, for instance, numerical simulation. As can be seen from FIG. 1, for choice of the parameter $x \lesssim 1$, a significant reduction of the variance $<\delta t^2>$ (and thus of the jitter) can result. In preferred embodiments of the invention $g(\omega)$ thus is selected such that $x>1$. The jitter reduction function of FIG. 1 corresponds to the mathematical expression $(3/2x^3)(2x-3+4e^{-x}-e^{-2x})$. In other cases a somewhat different mathematical expression may be appropriate.

In the exemplary case the parameter x is approximately equal to $N_f(B_{sol}/B_f)^2$, where $N_f$ is the number of intermediate bandwidth-limiting elements (filters) in the transmission path of length L (i.e., $N_f=L/a_f$, where $a_f$ is the average spacing between said elements), $B_{sol}$ is the FWHM width of the soliton spectrum, and $B_f$ is the FWHM spectral width of $g(\omega)$ of the bandwidth limiting elements. For purposes of this application we consider x to be equal to $N_f(B_{sol}/B_f)^2$ for those preferred systems in which the filters are regularly spaced a distance $a_f$ apart. More generally, $x=kL(B_{sol}/B_f)^2$, where k is a readily determinable proportionality constant, at least approximately equal to $a_f^{-1}$.

Figure 2:
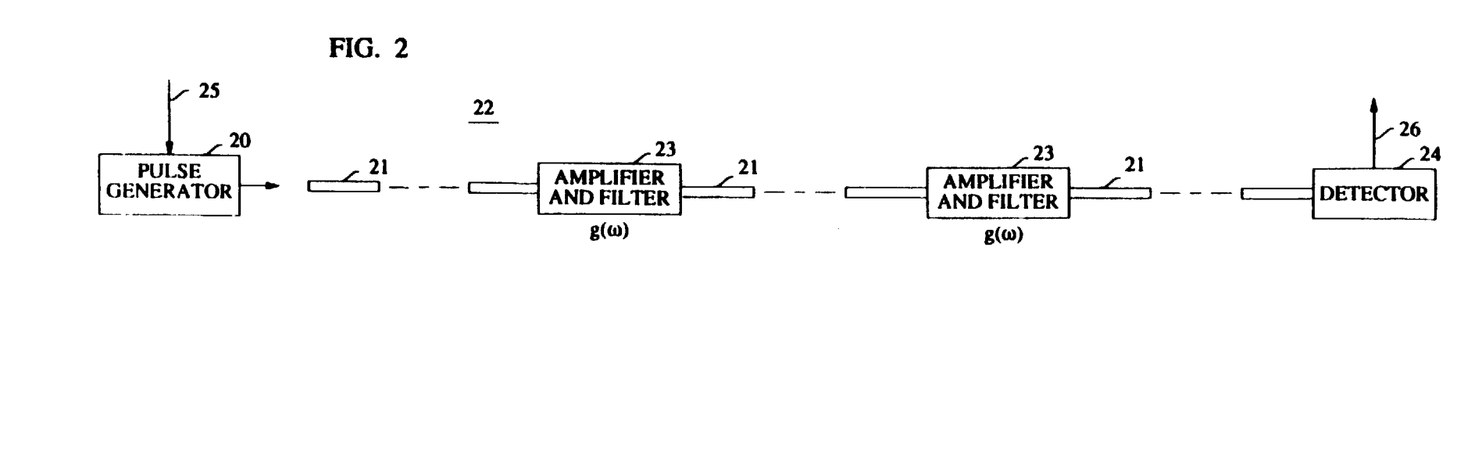
FIG. 2 schematically depicts an exemplary soliton communication system according to the invention.
Figure 3:
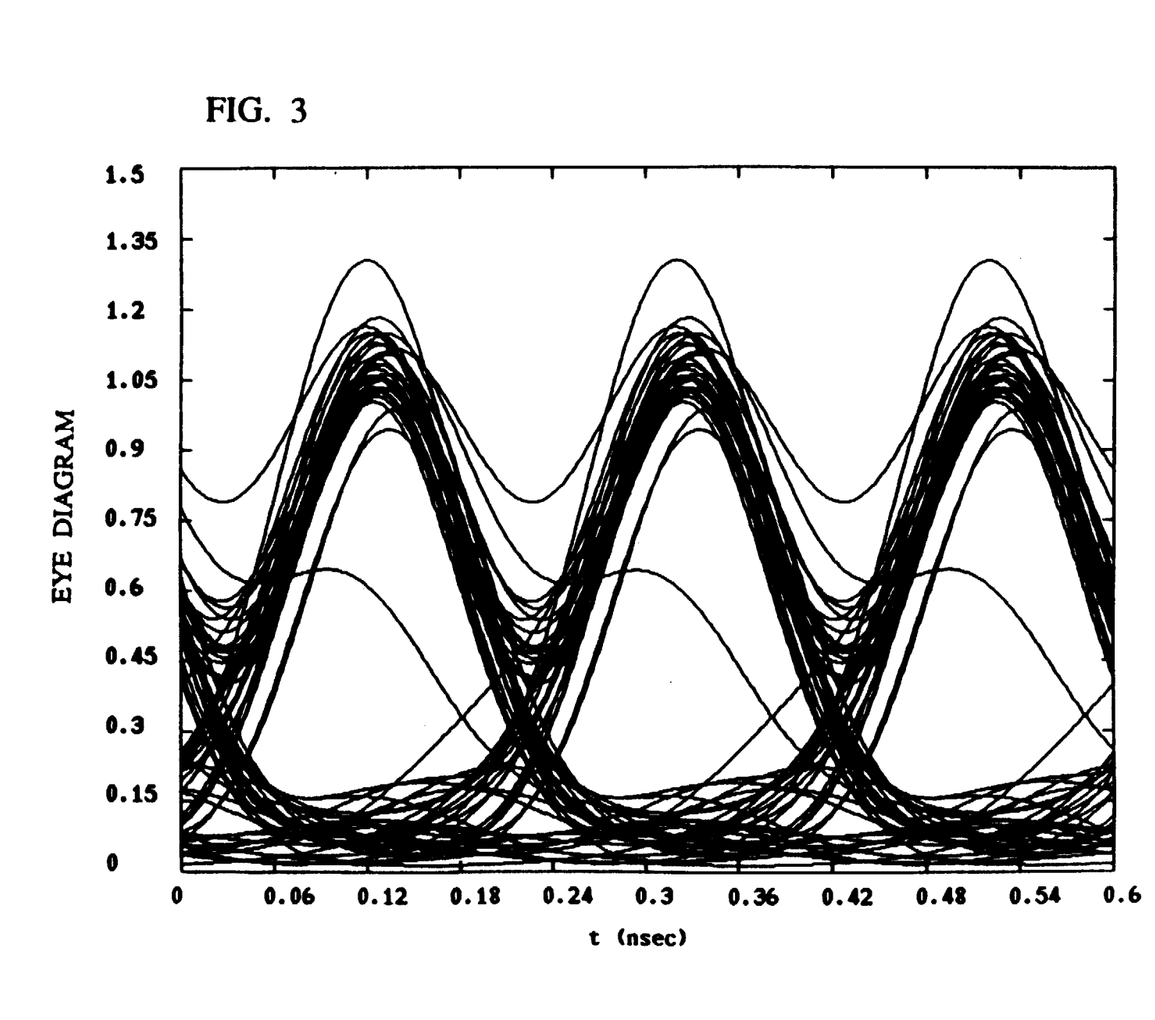
FIGS. 3-8 show computed eye diagrams, for various values of filter bandwidth, for an exemplary soliton communication system.
Figure 4:
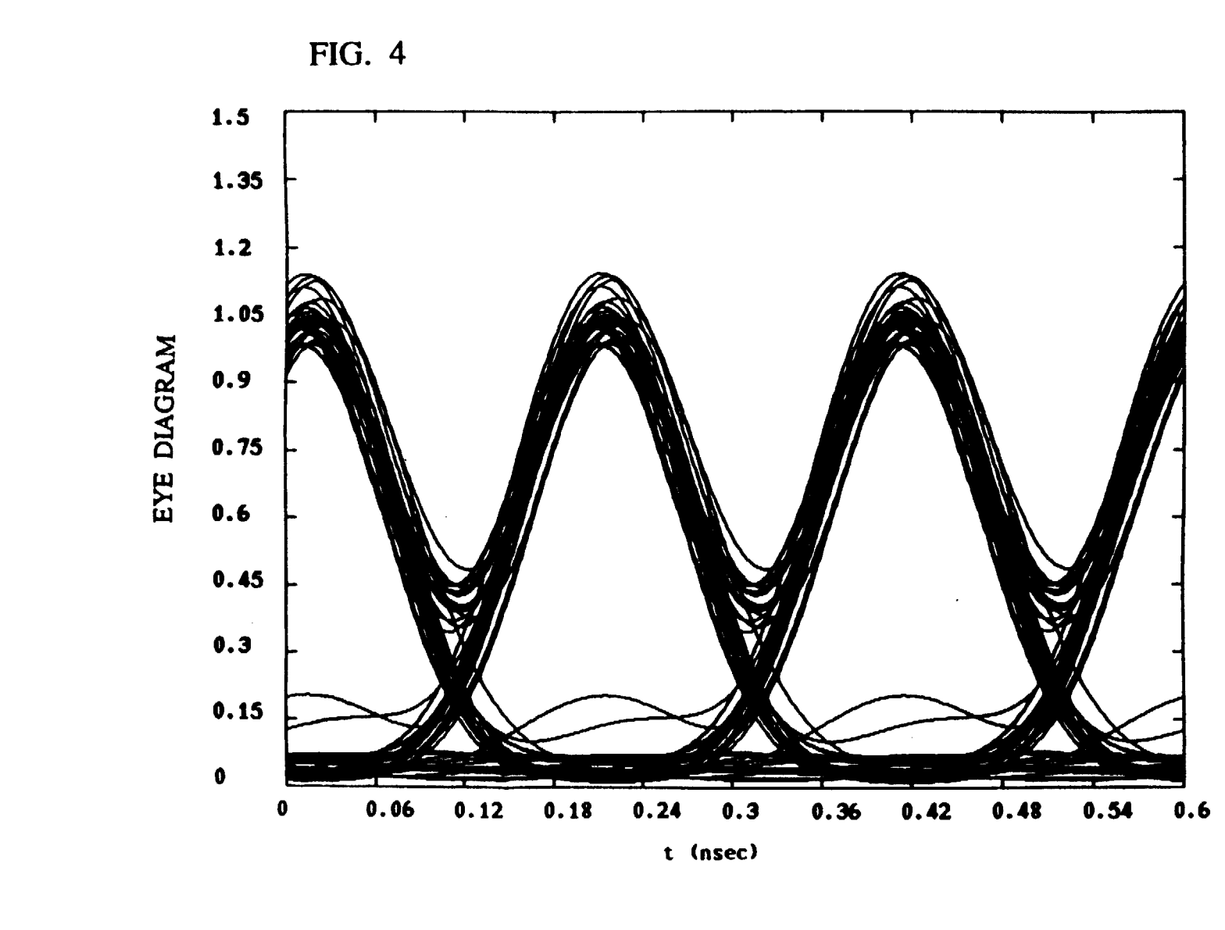
Figure 5:
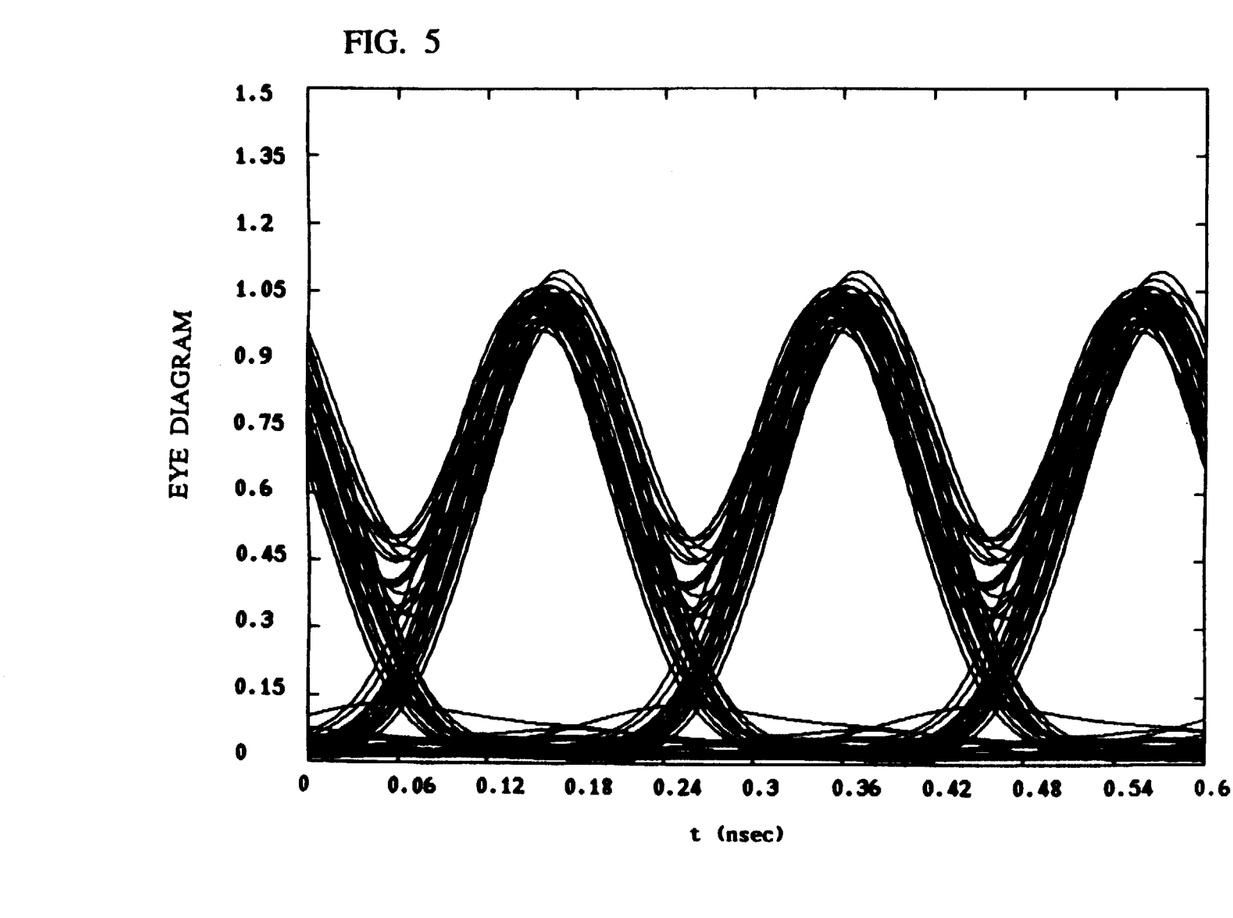
Figure 6:
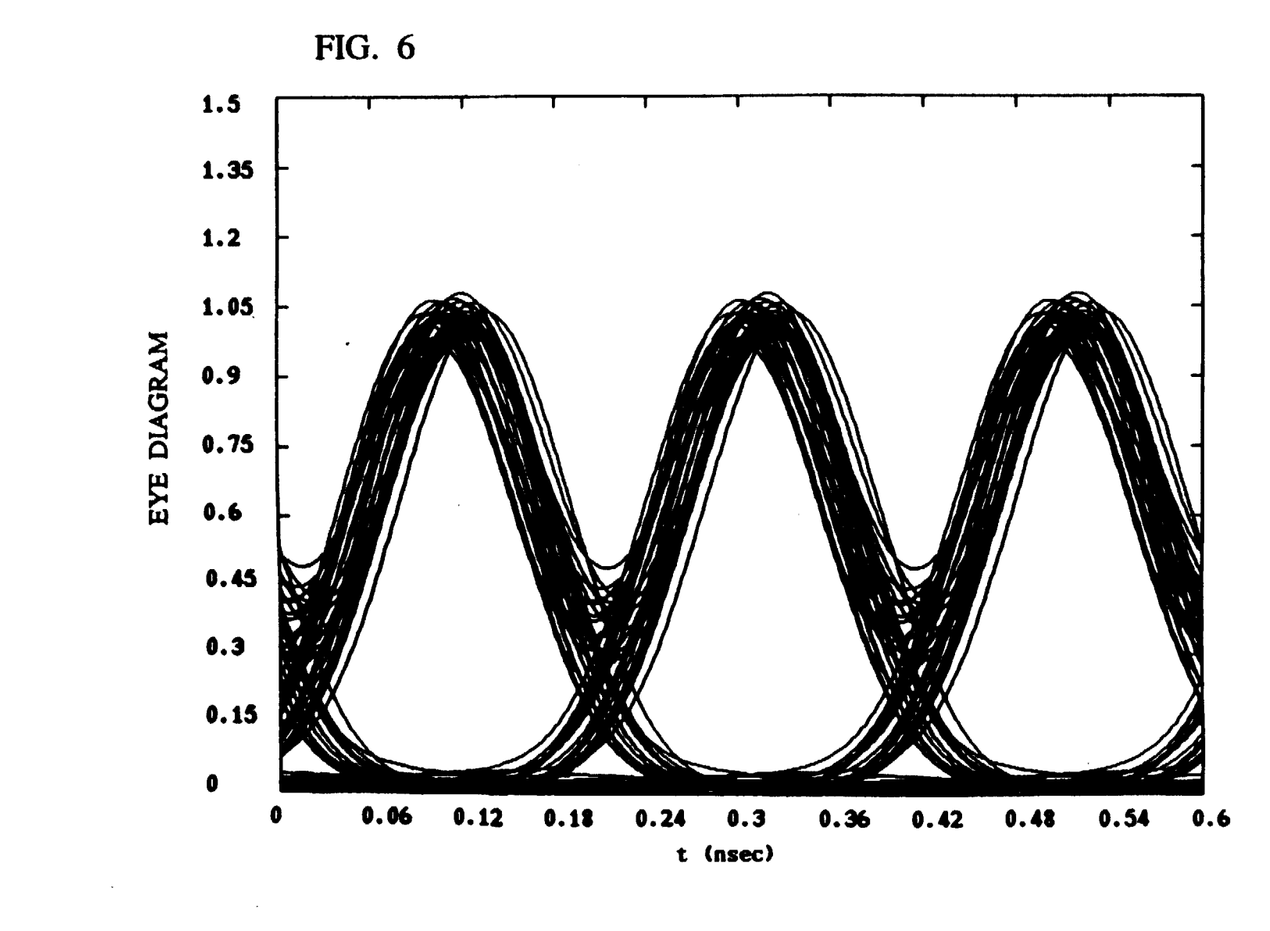
Figure 7:
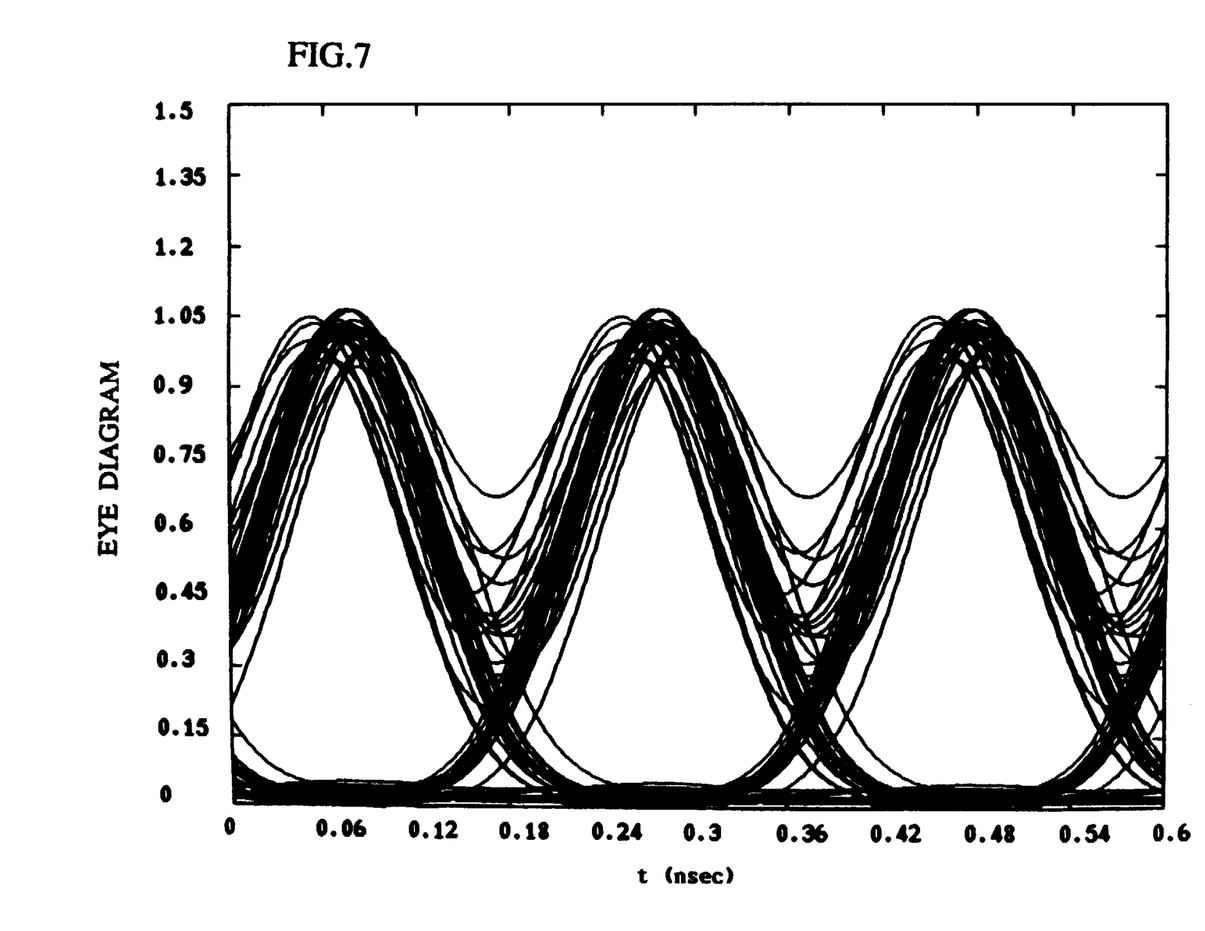
Figure 8:
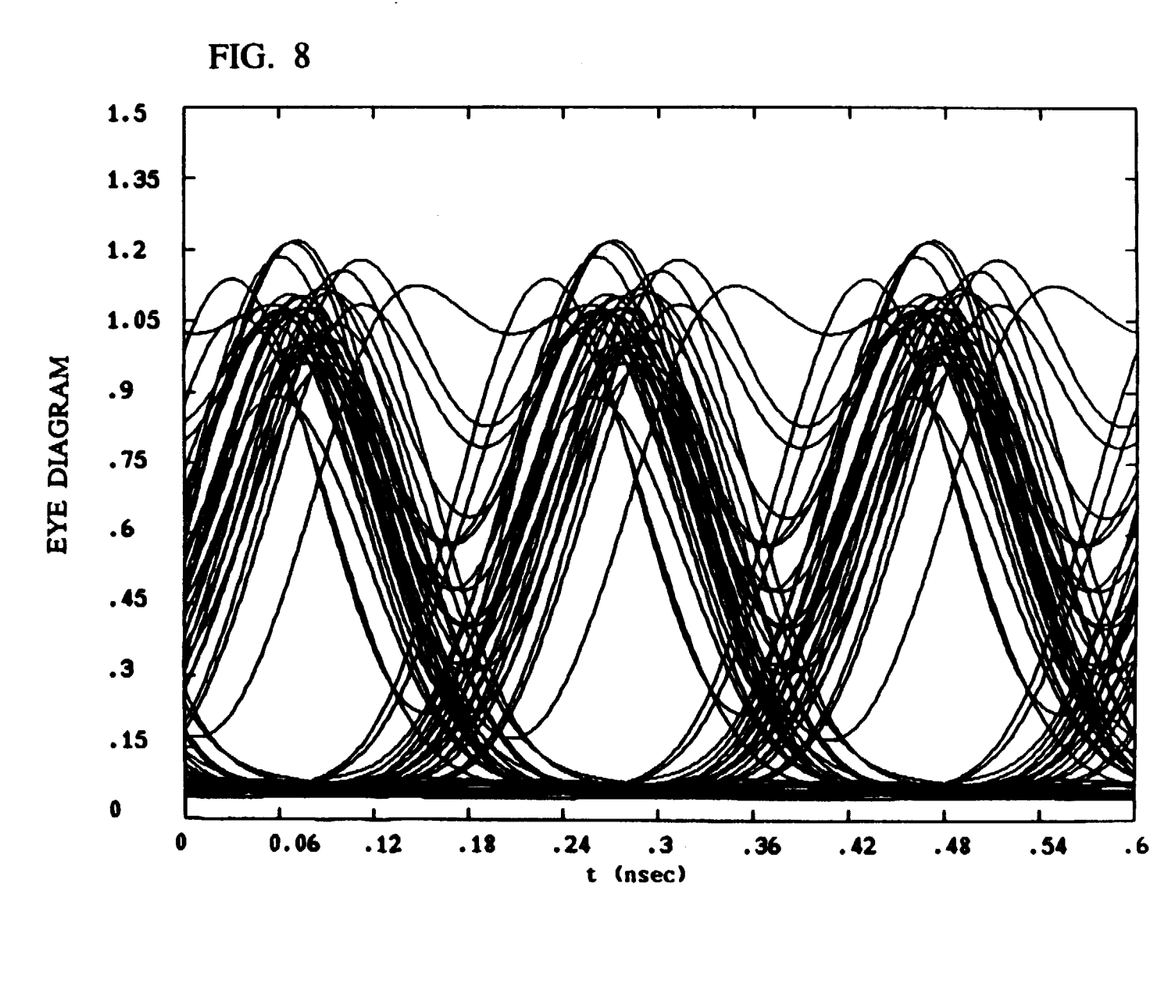

FIG. 2 schematically depicts an exemplary soliton optical fiber communication system according to the invention. Pulses of optical radiation of center frequency $\omega_o$ are generated in known pulse generator 20 and coupled into optical fiber transmission path 22. The output of 20 is modulated in accordance with input signal 25 in a known manner. The transmission path comprises lengths of single mode optical fiber 21 and, appropriately spaced, non-electronic amplifiers and filters 23. After transmission through the transmission path the optical pulses are detected by means of detector 24, the detector providing output signal 26. There are certain conditions on pulse power, pulse width, center frequency etc. that have to be met in order that the communciation system of FIG. 2 will operate as a soliton system. These conditions are known to those skilled in the art and will not be discussed herein.

In currently preferred embodiments of the invention, each amplifier 23 comprises a length of rare-earth (e.g., Er)-doped single mode optical fiber, followed by an optical filter (not separately shown), the combination selected to have the desired overall gain characteristic. Suitable optical filters are known. See, for instance, J. S. Stone et al., *Electronics Letters*, Vol. 23, page 781 (1987), incorporated herein by reference.

As is well known, non-electronic amplifiers such as Er-doped fiber amplifiers or Raman amplifiers require a source of pump radiation, and means for coupling the pump radiation into the amplifier fiber. These are not shown in FIG. 2.

In exemplary embodiments of the invention the filters have a FWHM bandwidth in the range 5-20 $B_{sol}$, preferably 8-15 $B_{sol}$. Typically the filter bandwidth is selected such that the value of the jitter reduction factor f(x) is less than 0.9, preferably less than 0.5, and such that x < 10, frequently < 5. As previously disclosed, choice of a too narrow filter results in degradation of the soliton pulses, and choice of a too wide filter results in insignificant jitter reduction. In an exemplary soliton system according to the invention, comprising 300 filters, the optimal value of $B_f/B_{sol}$ is about 10, as demonstrated by the series of computed "eye" diagrams of FIGS. 3-8. Eye diagrams are well known to those skilled in the art and do not require explanation.

The parameters used for computing the eye diagrams were: wavelength, $\lambda=1.55$ μm; effective core area of the single mode fiber, $A_{eff}=35$ μm$^2$; fiber dispersion, D = 1ps/(nm.km); spontaneous emission noise factor, $N_{sp}=2.2$; amplifier spacing, $z_a=33$ km; filter spacing, $z_f=33$ km; soliton pulse width (FWHM), $\tau_{sol}=1/10R$ (where R is the data rate, R = 5 Gb/s); fiber loss, $\alpha = 0.25$ db/km; fiber nonlinear coefficient, $N_2 = 3.2 \times 10^{-16}$ cm$^2$/W; length of fiber transmission path, L=about 9000 km.

In FIGS. 3–8, the filter bandwidth is varied (being 7.5, 9, 10, 11, 12 and 100 $B_{sol}$, respectively), with all other parameters being held constant. The Figures show that, at least for the assumed parameters, $B_f \sim 10 B_{sol}$ yields optimal results. For different parameters the optimal choice may be somewhat different. However, computer simulation will frequently be readily able to determine at least a nearly optimal filter bandwidth.

In view of our computer simulation results, we believe that in many cases choice of filter bandwidth in the range $B_{sol}(N_f/3)^{\frac{1}{2}} \pm 30\%$ will be advantageous. In systems according to the invention typically $0.1 N_{amp} \leq N_f \leq 1 N_{amp}$, preferably $0.5 N_{amp} \leq N_f \leq N_{amp}$.

Those skilled in the art will recognize that, due to the presence of the filters, the intermediate amplifiers in any inventive system typically have to provide somewhat greater gain than they provide in the comparison system that lacks the filters. The exact amount of additional gain depends typically on $B_f$, and should be sufficient to replace the energy loss in the filters. The exact amount can readily be determined by computation. However, the amount of amplification typically is not critical since inventive soliton systems are quite robust, with the soliton amplitude and pulse width able to adjust (within limits) to values appropriate to the amplification.

We claim:

1. A first optical fiber communication system comprising
    a) means for generating optical pulses, associated with said pulses being a center frequency $\omega_o$ and a bandwidth $B_{sol}$;
    b) means responsive to the optical pulses, said responsive means being spaced apart from said generating means;
    c) a length L of transmission path pulse-transmissively connecting said generating means and said responsive means, said length of transmission path comprising single mode optical fiber and a multiplicity $N_{amp}$ of spaced-apart non-electronic amplifiers, the first communication system being adapted for operation as a soliton fiber communication system;
    CHARACTERIZED IN THAT
    d) the transmission path comprises a multiplicity $N_f$ of spaced-apart bandwidth-limiting elements, associated with said elements being a nominal gain characteristic $g(\omega)$, with $g(\omega)$ selected such that the variance of the arrival time jitter ($<\delta t^2>$) at the responsive means is at most 90% of $<\delta t^2>$ associated with a comparison optical fiber communication system which is identical to the first communication system except that the transmission path of the comparison system does not comprise said bandwidth-limiting elements.

2. A system according to claim 1, wherein $0.1 N_{amp} \leq N_f \leq 10 N_{amp}$, wherein said bandwidth-limiting elements comprise optical filters, said optical filters having a center frequency nominally equal to $\omega_o$ and a bandwidth $B_f$ in the range 5–20$B_{sol}$.

3. A system according to claim 2, wherein $B_f$ is in the range 8–15 $B_{sol}$.

4. A system according to claim 1, wherein said bandwidth-limiting elements have bandwidth $B_f$, selected such that $0.1 \leq x \leq 10$, where $x = N_f(B_{sol}/B_f)^2$.

5. A system according to claim 1, comprising optical filters having a bandwidth $B_f$ selected such that a jitter reduction function $f(x) < 0.9$, where $x = N_f(B_{sol}/B_f)^2$ and $f(x)$ is at least approximately equal to $(3/2x^3)(2x - 3 + 4e^{-x} - e^{-2x})$.

6. A system according to claim 5, wherein $f(x) < 0.5$.

7. A system according to claim 5, wherein $f(x) = (3/2x^3)(2x - 3 + 4e^{-x} - e^{-2x})$.

8. A system according to claim 1, wherein associated with each amplifier is an optical filter having a center frequency nominally equal to $\omega_o$ and a bandwidth $B_f$ selected such that $B_f$ is in the range $B_{sol}(N_f/3)^{\frac{1}{2}} \pm 30\%$.

9. A system according to claim 1, wherein the responsive means are receiver means.

10. A system according to claim 1, wherein each of the multiplicity of non-electronic amplifiers comprises a length of rare earth-doped single mode optical fiber.

11. A system according to claim 1, wherein each of said bandwidth-limiting elements has a bandwidth in the range $B_{sol}(N_f/3)^{\frac{1}{2}} \pm 30\%$.

12. A system according to claim 1, wherein the system is a wavelength division multiplexed (WDM) soliton system.

13. A system according to claim 1, wherein the nominal center frequency of the bandwidth-limiting elements, $\omega_f$, is essentially equal to $\omega_o$.

* * * * *

UNITED STATES PATENT AND TRADEMARK OFFICE
CERTIFICATE OF CORRECTION

PATENT NO. : 5,140,656
DATED : August 18, 1992
INVENTOR(S) : Akira Hasegawa, Yuji Kodama and Dietrich Marcuse It is certified that error appears in the above-indentified patent and that said Letters Patent is hereby corrected as shown below:

On title page, item [73] should read as follows:
—AT&T Bell Laboratories, Murray Hill, N.J., and The Ohio State University, Columbus, Ohio—

Signed and Sealed this

Fourteenth Day of March, 1995

*Attest:*

BRUCE LEHMAN

*Attesting Officer*      *Commissioner of Patents and Trademarks*